United States Patent [19]

Walton

[11] 4,393,935
[45] * Jul. 19, 1983

[54] STIMULATION OF GAS WELLS WITH PHOSPHATE ESTER SURFACTANTS

[75] Inventor: William B. Walton, Cleburne, Tex.

[73] Assignee: BASF Wyandotte Corporation, Wyandotte, Mich.

[ * ] Notice: The portion of the term of this patent subsequent to Jul. 14, 1998, has been disclaimed.

[21] Appl. No.: 249,098

[22] Filed: Mar. 30, 1981

Related U.S. Application Data

[63] Continuation-in-part of Ser. No. 154,651, May 30, 1980, Pat. No. 4,278,129.

[51] Int. Cl.³ .............................................. E21B 43/22
[52] U.S. Cl. ................................. 166/263; 166/305 R; 166/312; 252/8.55 B
[58] Field of Search ............... 166/263, 273, 274, 275, 166/279, 305 R, 312; 252/8.55 B, 8.55 D

[56] References Cited

U.S. PATENT DOCUMENTS

| | | | |
|---|---|---|---|
| 2,927,639 | 3/1960 | Schuessler et al. | 166/305 R |
| 2,976,926 | 3/1961 | Maly | 166/263 |
| 3,366,584 | 1/1968 | Zimmerman | 252/8.55 D X |
| 3,435,898 | 4/1969 | Thompson | 166/274 |
| 3,467,194 | 9/1969 | Kinney et al. | 166/305 R |
| 3,470,958 | 10/1969 | Kinney | 166/305 R |
| 3,480,083 | 11/1969 | Oleen | 166/268 |
| 3,488,289 | 1/1970 | Tate | 252/8.55 B |
| 3,502,587 | 3/1970 | Stanford et al. | 166/279 X |
| 3,596,715 | 8/1971 | Halbert, Jr. | 166/274 |
| 3,620,303 | 11/1971 | Halbert, Jr. | 166/272 |
| 4,094,798 | 6/1978 | Tate et al. | 166/273 X |
| 4,278,129 | 7/1981 | Walton | 166/263 |

*Primary Examiner*—William F. Pate, III
*Assistant Examiner*—George A. Suchfield
*Attorney, Agent, or Firm*—Andrew E. Pierce

[57] ABSTRACT

Gas production wells, which no longer produce gas utilizing conventional primary and secondary means of recovery, can be returned to production by treatment comprising addition of an aqueous solution of certain phosphate ester surfactants followed by successive treatment with water. Increased production also can be obtained in low-producing gas wells by similar treatment with certain phosphate ester surfactants. Subsequent to treatment of a producer well, said phosphate ester surfactant aqueous solution is forced into the formation utilizing water and said surfactant and water mixture is allowed to remain in the producing well, for an effective period of time ranging from not less than 24 hours to one month. Thereafter, conventional fluid drive means are then utilized to recover gas from the subterranean gas formation.

10 Claims, No Drawings

STIMULATION OF GAS WELLS WITH PHOSPHATE ESTER SURFACTANTS

CROSS-REFERENCE TO RELATED APPLICATIONS

This is a continuation-in-part of copending Ser. No. 154,651, filed May 30, 1980 now U. S. Pat. No. 4,278,129.

BACKGROUND OF THE INVENTION

1. Field of the Invention

This invention relates to gas production well stimulation where said wells are low-producing or have ceased to produce by primary and secondary recovery means.

2. Description of the Prior Art

Certain phosphate esters have been used in conjunction with water-flood methods of driving oil toward producing wells as a means of secondary recovery of hydrocarbons. The phosphate esters are added to an injection well and perform various functions such as scale inhibition, and the formation of a slug for driving the oil in the formation toward the producing well. The phosphate ester can be injected into the well either as an aqueous solution or as a soluble oil micro-emulsion. Alkyl or aralkyl polyoxyalkylene phosphates are disclosed as useful surfactants in water-flood secondary recovery processes. Such processes are disclosed in U.S. Pat. Nos. 3,435,898, 3,596,715, and 3,480,083.

Producing oil and gas wells have long been treated to stimulate production thereof utilizing a method termed "acidizing" in which an emulsion of an aqueous mineral acid either alone or in combination with various surfactants, corrosion inhibiting agents, and hydrocarbon oils is added to a producer well. Presumably, such treatments tend to remove deposits from the area of the subterranean oil or gas formation immediately adjacent to the production well bore, thus increasing the permeability of the formation and allowing residual oil or gas to be recovered through the well bore. Another object of such "acidizing" treatment of oil or gas producer wells is the removal of water from the interstices of the formation by the use of a composition which materially lowers the interfacial forces between the water and the oil or gas. Various surface-active agents have been recommended for this use.

Usually, the surface-active agent is injected into the production well in combination with crude oil or other hydrocarbon solvent followed by the injection of additional crude oil to move the treating fluid into the formation. U.S. Pat. Nos. 3,467,194 and 3,470,958 provide specifically for the treatment of a crude oil production well utilizing an oil-external micellar dispersion or a water-external micellar dispersion followed by the injection of a hydrocarbon to move the micellar dispersion outwardly from the well bore into the formation. There is disclosed in U.S. Pat. No. 3,620,303 a method of treating a production well with an aqueous solution of an anionic orthophosphate ester surfactant. The aqueous surfactant solution is retained in the formation at least about 24 hours and thereafter the solubilized hydrocarbon is displaced toward the producer well by fluid drive means utilizing a second well bore which is in fluid contact with the underground oil formation. It is theorized that the surfactant solution forms a soluble oil micro-emulsion with the formation hydrocarbons.

There is no indication in any of the prior art references that the particular phosphate ester surfactants disclosed and claimed herein would be useful in returning to production gas wells which are low-producing or have ceased to produce. The method of the invention is particularly useful in the stimulation of gas wells which have failed to respond to acidizing treatment of the producing well including the use of various acids with various surfactants.

SUMMARY OF THE INVENTION

There is disclosed a method of increasing production or returning to production gas wells by the treatment of a production well comprising adding an aqueous solution of an oxyalkylated phosphate ester surfactant and thereafter adding water to drive the aqueous surfactant solution into the formation a distance of about 3 to about 20 feet from the well bore. The aqueous surfactant solution is allowed to remain in the formation for an effective period generally not less than 24 hours and preferably 24 hours to 1 month. Thereafter, the gas is recovered using conventional fluid drive means wherein water is injected into an injection well in communication with said gas subterranean formation.

DESCRIPTION OF THE PREFERRED EMBODIMENTS

The oxyalkylated phosphate ester which is an active ingredient in the process disclosed herein for increasing production or returning nonproducing gas wells to productivity is an alkyl or aralkyl polyoxyalkylene phosphate ester surfactant. The surfactant can be used in the free-acid form or as the alkali metal or ammonium salt. The phosphate esters of the invention have the formulas:

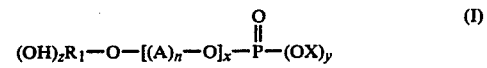

(I)

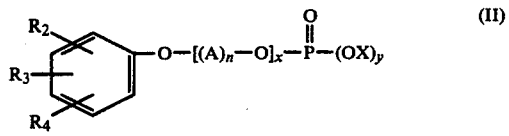

(II)

wherein $R_1$ represents an alkyl radical having 10 to 18 carbon atoms, for instance, nonyl, decyl, undecyl, dodecyl, tridecyl, tetradecyl, pentadecyl, hexadecyl, heptadecyl, octadecyl, nonadecyl, eicosyl, uneicosyl, docodyl, tricosyl, tetracosyl, pentacosyl, hexacosyl, and heptacosyl radicals. $R_2$ represents an alkyl of about 5 to 27 carbon atoms, e.g., pentyl, heptyl, hexyl, etc., higher alkyls of the same value as $R_1$, cycloalkyl, e.g., cyclopentyl, cyclohexyl, cycloheptyl, cyclooctyl, methylcyclopentyl, methylcyclohexyl, methylcyclooctyl, methylcyclobutyl, 1,1-dimethylcyclopropyl, ethylcyclopropyl, ethylcyclobutyl, 1-ethyl-2-methylcyclopropyl, 1,1,2-trimethylcyclopropyl, 1,2,3-trimethylcyclopropyl, 1,1-dimethylcyclopentyl, 1,2-dimethylcyclopentyl, 1,3-dimethylcyclopentyl, 1,2-dimethylcyclohexyl, 1,3-dimethylcyclohexyl, 1,4-dimethylcyclohexyl, ethylcyclohexyl, ethylmethylcyclopentyl, 1,1,2-trimethylcyclopentyl, cyclononyl, propylcyclohexyl, 1,2,4-trimethylcyclohexyl, 1,3,5-trimethylcyclohexyl, 1-isopropy-4-methylcyclohexyl, 1,2,4,5-tetramethylcyclohexyl, and radicals derived from mineral oils containing alkyl, cycloalkyl and mixed alkylcycloalkyl radicals having from about 12 to 27 carbon atoms. $R_3$ and $R_4$ represent either hydrogen, alkyl of from about 1 to 22 carbon atoms, e.g., methyl, ethyl, propyl, butyl, and the higher alkyls defined by $R_1$ and cycloalkyls defined by $R_2$ or radicals derived from mineral oils. A represents the residue of ethylene oxide, ethylene oxide and tetrahydrofuran, or mixed lower alkylene oxides selected from the group consisting of ethylene oxide, propylene oxide, and butylene oxide alone or including tetrahydrofuran, wherein the total molecular weight of said ester is about 500 to about 1500, preferably about 600 to about 1200, and wherein A can be heteric or block in molecular configuration. The degree of oxyalkylation is represented by n, x and y are 1 or 2, the sum of x and y is 3, and z is an integer of 0 to 5; X is hydrogen or a monovalent cation selected from the group consisting of at least one of an alkali metal and ammonium. In the formation of the polyhydroxyl oxyalkylene polymer, at least one alkylene oxide or tetrahydrofuran is utilized. Preferably at least 2 alkylene oxides or tetrahydrofuran and one alkylene oxide are utilized. In the formation of said phosphate ester surfactants, alkyl or aralkyl alcohols can be reacted with alkylene oxides in accordance with well known prior art procedures.

The phosphorus acid reactants with which the polyhydroxy oxyalkylene compounds are reacted in the formation of the phosphate esters of the invention can be selected from the group consisting of at least one of phosphorus pentoxide, and polyphosphoric acid. Where the polyhydroxy oxyalkylated compounds are derived from mixtures of lower alkylene oxides or tetrahydrofuran, it is preferred that the compounds be mixtures of ethylene oxide and propylene oxide and that where block or heteric copolymers of these alkylene oxides are formed, it is preferred that the proportion of ethylene oxide be about 10 to about 90 percent by weight and the proportion of propylene oxide be about 90 percent to about 10 percent by weight. These surfactants can be utilized in the form of mono-, di- and mixed mono- and diphosphate esters. Where the surfactants are utilized in the free acid form, the monoesters are characterized by the formulas above in which X is hydrogen.

The aqueous medium which is utilized to form the solution of the phosphate ester surfactant as well as the drive water can be soft, brackish, or a brine. Preferably, the water is soft but it can contain small amounts of salts which are compatible with the ions in the subterranean gas formation being treated.

The phosphate ester disclosed has been found superior to the surfactants disclosed in the prior art as useful in gas well stimulation and thus the disclosed phosphate ester surfactant can be utilized as the sole surfactant in preparing the aqueous solution useful in treating the gas production well. Generally, the concentration of said surfactant in the aqueous medium is about 5 to about 50 percent by weight, preferably about 10 to about 20 percent by weight, and most preferably about 12 to about 18 percent by weight. The amount of aqueous surfactant solution utilized in the treatment of a gas well will, of course, vary with the vertical feet of gas bearing formation around the producing well bore. Generally, there is injected into the gas-bearing subterranean formation, about 0.5 to about 10 barrels of the aqueous surfactant solution per vertical foot of gas-bearing formation. There is thereafter added to the well sufficient water into the well bore to drive or displace said aqueous surfactant solution out into the formation. Generally, the aqueous surfactant solution is retained in the formation not less than 24 hours and preferably 24 hours to 1 month. Thereafter, the aqueous solution of said phosphate ester and said hydrocarbon are displaced from the formation by conventional fluid drive means by use of an injection well in fluid communication with the treated production well. The desired gas is thereby produced.

The following examples illustrate the various aspects of the invention but are not intended to limit its scope. When not otherwise specified throughout this specification and claims, temperatures are given in degrees centigrade and parts, percentages, and proportions are by weight.

EXAMPLE 1

A gas well in Southeast Texas, which had been producing 40,000 cubic feet per day, was treated in accordance with the process of the invention utilizing a 15 percent aqueous solution of a mixed mono- and diphosphate ester of a block copolymer of 85 percent by weight ethylene oxide and 15 percent by weight propylene oxide initiated with an aliphatic alcohol having 10 to 12 carbon atoms and a molecular weight of about 900 in the amount of 1 barrel per vertical foot of perforation. The aqueous phosphate ester solution was displaced from the well into the formation with water and the well was closed for a period of 72 hours. At the end of this time, the well was opened up and production occurred at the rate of 1 million cubic feet of gas per day. This production rate was maintained for over 3 weeks.

While this invention has been described with reference to certain specific embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The embodiments of the invention in which an exclusive privilege or property is claimed are defined as follows:

1. A method of treating gas-bearing subterranean formations to improve permeability thereof and increase or restore production of gas comprising introducing into said formation through a producing means in fluid communication with said gas-bearing subterranean formation, a treating fluid comprising:
(A) an aqueous solution of about 5 to about 50 weight percent of an alkyl or aralkyl polyoxyalkylene phosphate ester surfactant having the formula:

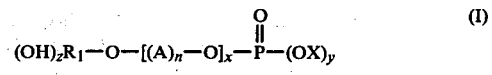

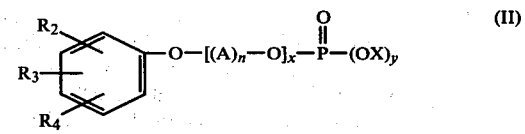

wherein $R_1$ represents an alkyl radical containing from about 10 to 18 carbon atoms, $R_2$ represents an alkyl radical of about 5 to about 27 carbon atoms or a cycloalkyl radical and radicals derived from mineral oils containing alkyl, cycloalkyl and mixed alkylcycloalkyl radicals having from about 12 to 27 carbon atoms, $R_3$ and $R_4$ represent either hydrogen or alkyl of from about 1 to 22 carbon atoms and the higher alkyls defined by $R_1$ and cycloalkyls defined by $R_2$ or radicals derived from mineral oils; A represents the residue of ethylene oxide, ethylene oxide and tetrahydrofuran, or mixed lower alkylene oxides selected from the group consisting of ethylene oxide, propylene oxide, butylene oxide, alone or including tetrahydrofuran, wherein the total molecular weight of said ester is about 500 to about 1500, and wherein A can be heteric or block in molecular configuration; n represents the degree of oxyalkylation; x and y are 1 or 2, the sum of x and y is 3 and z is an integer of 0 to 5; X is hydrogen or a monovalent cation selected from at least one of the group consisting of an alkali metal, and ammonium; and thereafter, (B) injecting water into the pore space adjacent to the well bore in amounts sufficient to displace the aqueous solution of said phosphate ester out into the formation, (C) retaining said aqueous solution of said phosphate ester and water within said formation for a period of not less than 24 hours and (D) thereafter, pumping and/or displacing said aqueous solution of said phosphate ester and said water from said formation into the well bore by injecting water into said formation by an injection means in fluid communication with said gas-bearing subterranean formation to produce the desired gas through said producing means.

2. The process of claim 1 wherein said aqueous solution of said phosphate ester surfactant is injected into said formation at the rate of about 0.5 to about 10 barrels of said aqueous solution per vertical foot of gas-bearing formation and retained in the subterranean gas formation for a period of 24 hours to 1 month.

3. The process of claim 2 wherein said phosphate ester is (II).

4. The process of claim 2 wherein said phosphate ester is (I), prepared by reacting a polyhydroxy oxyalkylated compound with a phosphorus acid reactant selected from the group consisting of phosphorus pentoxide, polyphosphoric acid, and mixtures thereof.

5. The process of claim 4 wherein said polyhydroxy oxyalkylated compound is a block or heteric copolymer wherein A represents the residue of ethylene oxide, ethylene oxide and tetrahydrofuran, or mixed lower alkylene oxides selected from the group consisting of ethylene oxide, propylene oxide and butylene oxide alone or including tetrahydrofuran.

6. The process of claim 5 wherein said polyhydroxy oxyalkylene compound is the reaction product of at least one monohydric alcohol having 10 to 15 carbon atoms.

7. The process of claim 6 wherein said polyhydroxy oxyalkylated compound is a block copolymer of ethylene oxide and propylene oxide having a molecular weight of about 600 to about 1200.

8. The process of claim 7 wherein said block copolymer is prepared by successively reacting ethylene oxide and propylene oxide in the proportion of 10 to 90 percent by weight to 90 to 10 percent by weight respectively.

9. The process of claim 8 wherein said block polymer is prepared by successively reacting 15 percent by weight propylene oxide followed by 85 percent by weight ethylene oxide with a monohydric aliphatic alcohol having 10 to 12 carbon atoms.

10. The process of claim 9 wherein said block polymer has a molecular weight of 900.

* * * * *